June 24, 1958 — W. F. BILLINGSLEY — 2,840,133
TUBELESS TIRE AND RIM ASSEMBLY
Filed July 27, 1955 — 3 Sheets-Sheet 1

INVENTOR.
WILLIAM F. BILLINGSLEY
BY
ATTY.

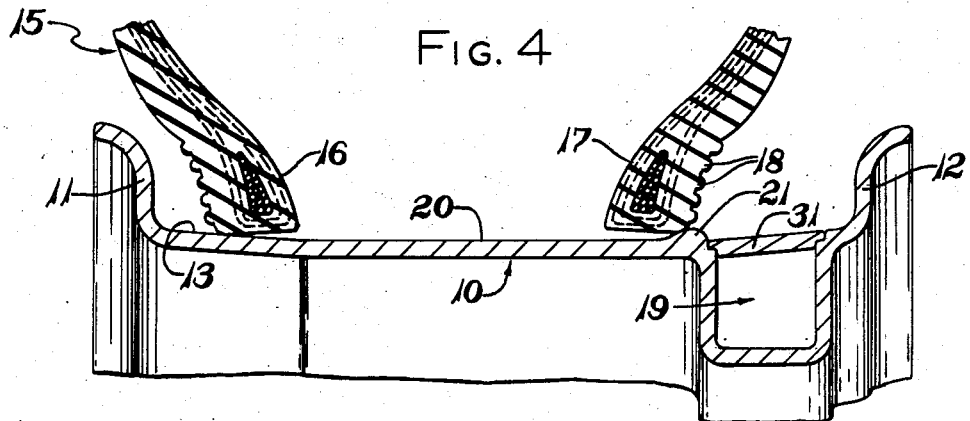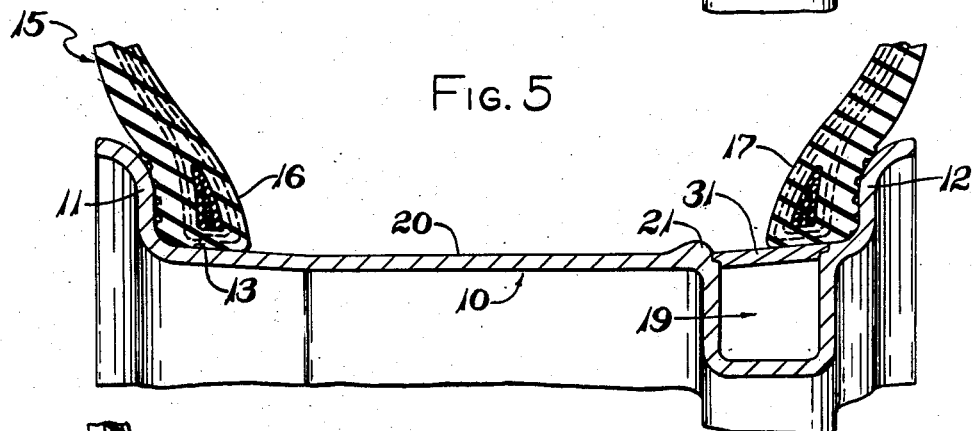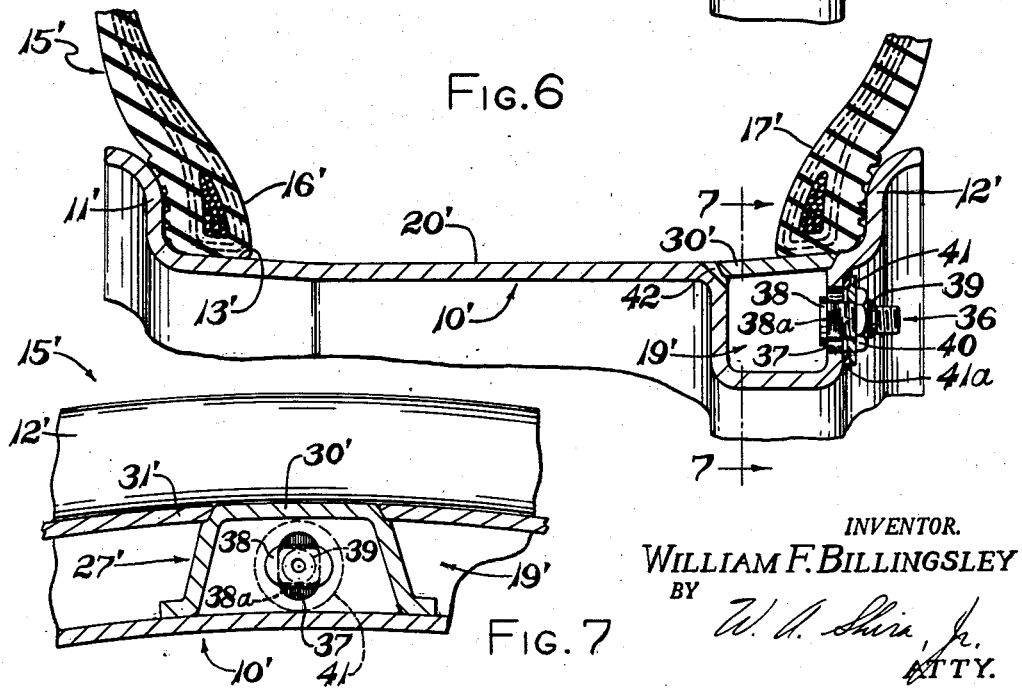

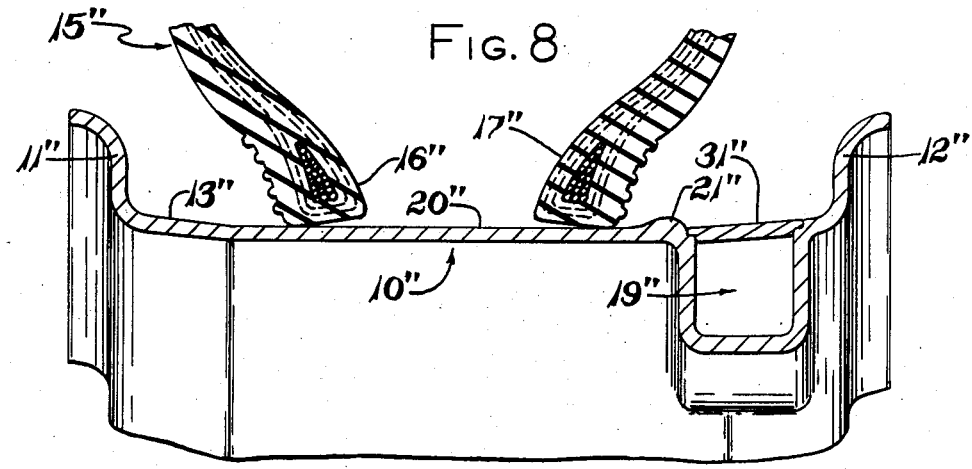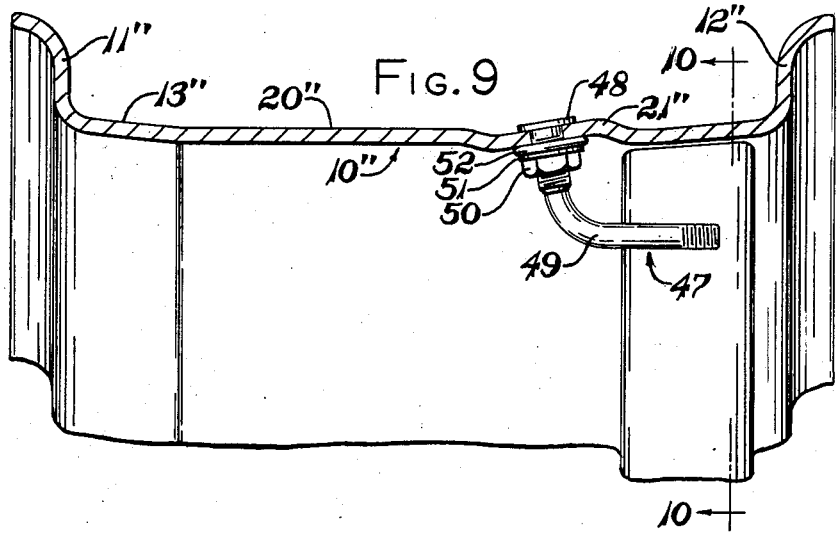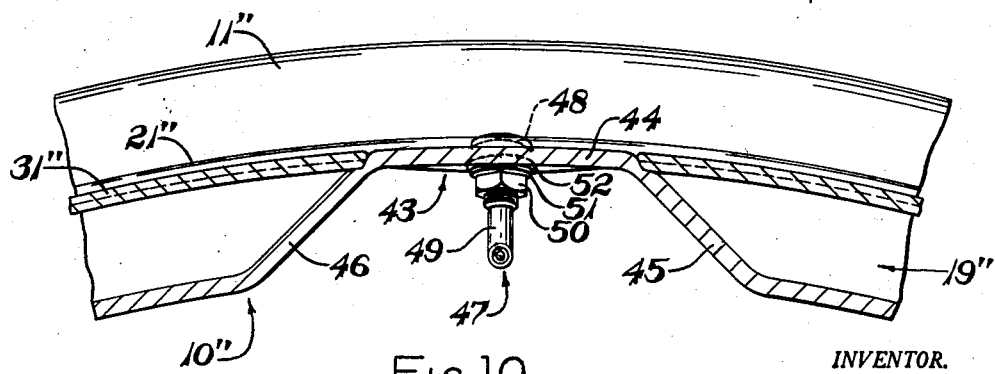

United States Patent Office 2,840,133
Patented June 24, 1958

2,840,133

TUBELESS TIRE AND RIM ASSEMBLY

William F. Billingsley, Silver Lake, Ohio, assignor to The B. F. Goodrich Company, New York, N. Y., a corporation of New York Application July 27, 1955, Serial No. 524,731

22 Claims. (Cl. 152—396)

This invention relates to an improved vehicle tire rim and, more particularly, to an improved rim for tubeless tires and to the combination therewith of such a tire.

The modern styling trend in passenger automotive vehicles is toward lower bodies and through the years this trend has been reflected in ever smaller diameter wheels and tires. Further decrease in the diameter of wheels having the conventional drop center rims is, however, very limited in amount unless there is a decrease in diameter of the brake drum. This is not desirable in view of the high power and large size of the majority of modern passenger automobiles. Decrease in wheel diameter by elimination of the well of the drop center rim is also undesirable because this well greatly facilitates mounting and demounting of tires while affording a relatively inexpensive air-tight construction necessary for use with tubeless tires.

The principal object of this invention is, therefore, to provide an improved tire and rim assembly of the tubeless type, wherein the tire and rim cooperate to form an airtight compartment, the construction being such that the wheel diameter may be reduced thus making possible the use of a tire with smaller bead diameter but without reduction of diameter in the region available for the brake drum and while retaining the same ease of tire mounting and de-mounting that is available with the conventional drop center rim.

A more specific object of the invention is to provide an improved rim for vehicle tires of the tubeless type characterized by having a substantially cylindrical rim base and integral side flanges with a bead-receiving well adjacent one side flange which is adapted to be covered after a tire is mounted on the rim to provide a bead seat for the tire, the valve for controlling application to or exhausting of air from the tire being provided in the portion of the rim adjacent said one flange.

A still more specific object of the invention is to provide an improved rim as defined in the preceding paragraph wherein the covering of the rim well includes a fixed wall over the valve to facilitate the initial inflation of the tire and to prevent contact of a tire bead with the valve and a removable resilient band which cooperates with the fixed wall and the rim base to provide a smooth continuation of the latter.

Another object of this invention is to provide an improved tire and rim assembly of the tubeless type wherein the rim has a substantially cylindrical base portion with a tapered bead seat adjacent one side flange and a bead-receiving well adjacent the other side flange, there being a raised circumferentially extending surface on the rim base adjacent the inner edge of the well to provide a temporary bead seat for the tire during mounting and the initial inflation thereof, the assembly also comprising means to bridge the said well and provide a permanent bead seat for the tire together with a valve means in the well cooperating with a passageway leading therefrom to the region of the rim base intermediate the said one flange and the raised surface so that air under pressure applied to the valve will effect seating of the tire beads with the sides thereof in sealing engagement with the side flanges of the rim.

The invention further resides in certain novel features of construction of the rim and the combination therewith of a tubeless tire, and further objects and advantages of the invention will be apparent to those skilled in the art to which the invention pertains from the following description of the present preferred embodiment thereof, and certain modifications, described with reference to the accompanying drawings, forming a part of this application, and in which:

Fig. 4 is a view similar to Fig. 1, with the removable well-bridging member in place and the tire beads positioned in readiness for movement to seated position;

Fig. 5 is a view similar to Fig. 4, but showing the tire beads fully seated and in air-sealing relationship with the side flanges of the rim;

Fig. 6 is a fragmentary sectional view through a modified construction with a tire mounted thereon and having its beads fully seated in air-sealing relationship with the side flanges of the rim;

Fig. 7 is a sectional view taken substantially on the section-indicating line 7—7 of Fig. 6 and looking in the direction indicated by the arrows, the tire being removed for clarity;

Fig. 8 is a fragmentary sectional view through a still different embodiment of the invention;

Fig. 9 is a fragmentary sectional view through the embodiment illustrated in Fig. 8 but taken at a different circumferential location and with the tire removed to more fully disclose the nature of the rim and the manner in which the valve is mounted therein; and Fig. 10 is a fragmentary sectional view taken substantially on the section-indicating line 10—10 of Fig. 9.

Figure 1:
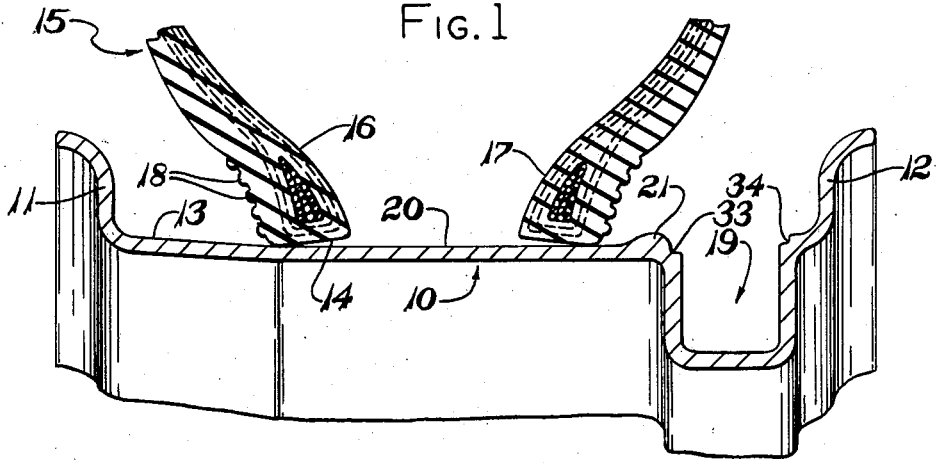
Fig. 1 is a fragmentary transverse sectional view through the presently preferred embodiment of the invention showing an intermediate stage in the mounting of a tubeless tire on the improved rim, the cover for the bead-receiving well being removed and the connection of the rim to the supporting wheel being omitted.

Referring first to Fig. 1 of the drawings, it will be seen that the improved rim illustrated therein comprises a substantially cylindrical base portion 10 with integral side flanges 11 and 12 extending substantially radially outwardly from the rim base. Adjacent one side flange, such as flange 11, the rim base 10 is provided with a tapered bead seat 13 for receiving a bead base 14 of a tire 15. The tire 15 is of the tubeless type and of well-known construction comprising an annular open bellied carcass terminating in spaced beads 16 and 17. The side faces of the beads 16 and 17 are provided with spaced, circumferentially extending, sealing ribs 18 which are adapted to engage the side flanges 11 and 12 of the rim in air-tight sealing relationship so that the body of the tire and the rim cooperate to provide an air-tight compartment. Since the construction of the tire 15 is conventional and, per se, forms no part of this invention, only the bead portions of the tire have been indicated in the drawings.

Adjacent the side flange 12 of the rim the base 10 thereof is provided with a radial recess or well 19 extending circumferentially around the entire periphery of the rim. The width of the well 19 should be at least sufficient to freely accommodate one bead of the tire and the depth of the well is such that when part of the circumference of a tire bead is received in the well, the remainder of the circumference can be readily passed over the adjacent side flange of the rim in the manner which will be readily understood from the manner in which drop center rims are utilized. Thus, in mounting a tire upon a rim so constructed, one bead, such as the bead 16, is positioned with a portion thereof within the well 19 and the remainder of the bead is then passed over the adjacent flange 12. The tire is then shifted until the bead 16 is concentric with the rim thus allowing the bead 16 to move up upon the substantially cylindrical central portion 20 of the rim base 10. The other bead 17 is then passed over the flange 12 by allowing a portion of the bead to enter the well 19, as will be readily understood. The bead 17 is then likewise moved upon the cylindrical central portion 20 of the rim 10 and the beads 16, 17 will occupy the positions substantially as shown in Fig. 1.

In order to provide for proper seating of the tire beads upon the rim and to prevent relative movement therebetween as well as to facilitate the provision of an airtight-seal, it is customary to have the bead seats on the present rims tapered upwardly toward the adjacent side flanges by an amount which is in the order of 5 degrees. A similar taper is provided for the bead seat 13 of the rim of this invention, the greatest diameter of the bead seat being at least equal to the diameter of the bead base 14 of the tire.

To facilitate movement of the tire beads across the rim base, the central portion 20 of the base has a diameter slightly less than that of the diameter across the bead bases of the tire. Therefore, the tire beads will readily move to the outer edges of this central cylindrical portion 20 and the bead 17 would tend to drop back into the well 19 if the diameter of the rim adjacent the edge of the well were substantially uniform and the same as that of the central part 20 of the rim. In the preferred embodiment of applicant's rim, however, the region adjacent the inner edge of the well 19, which is remote from the side flange 12, has a raised surface or projection 21 extending circumferentially about the entire periphery of the rim base. The height of the projection 21 is substantially the same but not greater than the greatest height of the bead seat 13. Therefore, the raised surface 21 not only prevents the bead 17 from freely dropping back into the well 19, but also provides a temporary seat for the bead 17 to facilitate the later positioning of the bead in its proper location upon application of air under pressure to the interior of the tire, as will be hereinafter described in detail.

As mentioned heretofore, the rim of this invention is designed for use with a tubeless tire, and therefore means must be provided by which air can be admitted into the compartment or container formed by the tire and rim for the purpose of seating the tire beads and for inflating the tire to its proper operating pressure. In the preferred embodiment, this valve means is shown as being secured in a wall of the well 19 by providing an inwardly projecting portion or boss 22 of the outer sidewall of the well and threading the internal surface of this projection or boss for receiving the threaded outer surface of the inner end of a tire valve 23. The valve 23 has the usual valve core or inside utilized with inflation valves for inner tubes or tubeless tires as is readily understood.

In the embodiment illustrated in Figs. 1–5, the valve 23 is shown as provided with a securing nut 24 cooperating with a metal washer 25 to exert pressure upon a resilient washer 26 placed between the metal washer and the adjacent wall of the rim, thereby providing an airtight connection for the valve. The boss 22 in which the stem of the valve is threaded can be located either in the base of the well or in the side wall thereof and may be provided in any desired manner, as for instance by drawing and/or punching the adjacent portion of the wall of the well to provide a part thereof extending inwardly, or additional material may be secured to the wall of the well at the location of the valve by welding or the like. The valve 23 may also be secured to the wall of the well by other means, as for example by welding it directly to an opening in the well or by employing a valve of different construction.

The region of the well 19 adjacent the valve 23 is bridged to permit inflation of the tire and to prevent entrance of the tire beads into the well at this location so that the beads may not contact the inwardly projecting portion of the valve or its mounting which might cause injury to the sealing ribs 18 on the tire beads. As here shown, this covering or bridging of the rim is effected by a wall member 27 which is substantially inverted U-shaped and has a width in the order of the width of the well with the lower end portions turned outwardly circumferentially of the well, as indicated at 28 and 29 in Fig. 3, for seating upon the bottom of the well. The upper surface 30 of the wall member 27 is transversely inclined at an angle in the order of 5 degrees so that it provides a portion of the seat for bead 17 of the tire 15. The wall member 27 is permanently secured in place in air-sealing relationship with the rim, as by welding or like operation, and provides a compartment or enclosure about the inner end of the valve. Although this prevents a portion of the well 19 from being used to receive a bead of the tire during the mounting operation, the circumferential extent of this wall or bridging member 27 is so small that it has little tendence to hamper the tire mounting operation.

Figure 2:
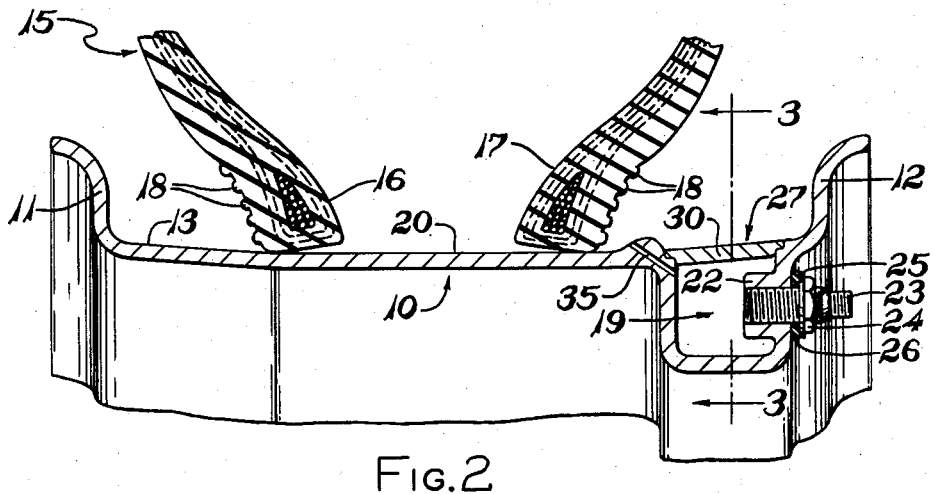
Fig. 2 is a view similar to Fig. 1, but taken at a different circumferential location to show the valve and the covering member therefor.
Figure 3:
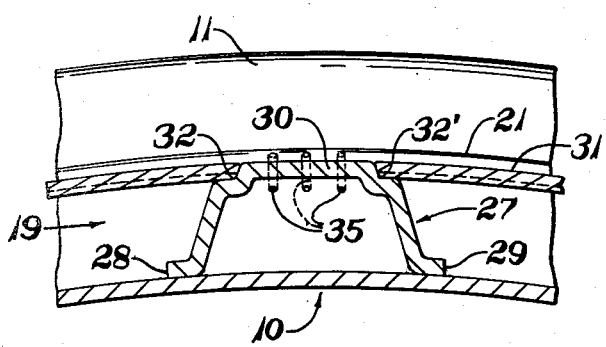
Fig. 3 is a fragmentary sectional view taken substantially on the section-indicating line 3—3 of Fig. 2 with the tire removed but showing a portion of the removable well-bridging member in place.

After a tire has been positioned upon the rim base 10 as has been described, and as is shown in Fig. 2, the open portion of the well 19 must be covered to provide a seat for the bead 17. In accordance with this invention, this covering or bridging of the well is achieved by means of a resilient split metal band or ring 31, the circumferential extent of which is such that it, together with the surface 30 of the fixed wall portion, completes the coverage of the entire circumferential extent of the well. In order to retain the split ring or band 31 in proper position, the wall member 27, adjacent the upper surface 30, is provided with recesses at either circumferential end thereof and the adjacent side edges of the well in the rim are likewise provided with recesses so that shoulders 32, 32' and 33, 34 are provided on the wall member 27 and sides of the well, respectively, between which the resilient band or ring 31 removably fits in substantially sealing relationship, as will be apparent from Figs. 3 and 4. The recesses providing the shoulders 33 and 34 at the side edges of the well 19 are so located that the upper surface of the band 31 has an inclination or taper in the order of 5 degrees so that it corresponds in shape with the bead seat 13 and provides a smooth continuation of the adjacent surface of the rim at the base of the flange 12.

After the band or ring 31 has been placed in the rim in covering relationship to the well, the tire 15 is manipulated to cause the beads 16 and 17 to move to the locations substantially as shown in Fig. 4, from which it will be seen that the bead 16 has moved a part of the way up the bead seat 13 and the bead 17 has taken a position in which at least a portion thereof rests upon the circumferentially extending raised surface 21 which forms the temporary seat for this bead of the tire. In this position of the tire beads they form a sufficiently air-tight seal with the rim to permit build up of air pressure therein, which air pressure is utilized to force the beads to their permanent location adjacent the side flanges 11 and 12 of the rim.

This air is applied through the valve 23 and enters the well 19 in the enclosure or compartment beneath the wall member 27. In order that this air may be communicated to the interior of the tire, a passage or passages, such as drilled openings 35, are provided in the wall of the rim base 10 at an incline extending from the well 19 to a location inwardly of the rim base with respect to the raised surface 21, see Fig. 2. Preferably, several passages such as 35 are provided in order that sufficient volume of air can be rapidly built up within the tire to cause the bead 16 to be forced up upon the bead seat 13 and the bead 17 to pass from its position on the raised portion 21 up on to the bead seat provided by the upper surface 30 of the wall 27 and the removable band 31. The position of the parts is then as shown in Fig. 5, from which it will be seen that the beads 16 and 17 are in air-sealing engagement with the side flanges 11 and 12, this sealing engagement being rendered airtight by virtue of the circumferentially extending ribs 18 as is now well known in the art. After the beads have thus been fully seated, the air contained within the compartment provided by the tire and rim can be adjusted to the desired pressure for running and this air pressure will be retained since it will be noted that the tire bead 17, being in sealing engagement with the flange 12, prevents any leakage due to possible openings between the rim base and the removable annular bridging member 31, see Fig. 5.

A tire mounted upon a rim as here disclosed can be removed therefrom by exhausting the air contained therein through operation of the valve 23 and then forcing the tire beads from their bead seats to the substantially cylindrical central portion 20 of the rim in the usual manner which is employed in removing tires from hump type drop center rims. The removable wall portion or bridging member 31 is then removed from its location at the entrance of the well 19 and the tire beads 17 and 16 are successively passed over the side flange 12, this being facilitated by allowing a portion of each of the tire beads to sequentially enter the well 19, as will now be readily understood.

Figs. 6 and 7 show a modification of the invention in which the rim includes base and side flange portions with a well adjacent the one side flange as has been previously described with respect to Figs. 1 to 5. Therefore, these and other similar parts are identified by the same numbers as employed in the embodiment illustrated in Figs. 1 to 5, but with a prime mark added thereto. Thus, as will be apparent from Fig. 6, the instant form of rim comprises the rim base 10', having a central, substantially cylindrical, portion 20', and the integral side flanges 11', 12' with which the beads 16', 17' of a tubeless tire 15' are adapted to cooperate to provide an air-tight compartment or container. Adjacent the flange 11' the rim base 10' has a tapered bead seat 13' and adjacent the side flange 12' the rim base has a radial circumferentially extending well or recess 19'.

The well or recess 19' is provided with an inflation valve 36 extending through a wall of the well. As here shown, this is effected by providing the outer side wall of the well 19' with an elongated opening 37. This elongated opening is adapted to permit passage therethrough of a correspondingly shaped elongated base portion 38 of the valve 36 when the base and opening are aligned. However, when the valve is turned about its axis 90° to the portion as shown in Figs. 6 and 7, the ends of the valve base extend on either side of the opening so that the valve is prevented from passage through the opening. The portion 38A of the valve base received in the opening 37 is preferably squared to cooperate with the sides of the opening and prevent rotation of the valve. Extending forwardly from the base 38 is a threaded shank portion 39 of the valve which projects outwardly of the rim and is adapted to have a retaining nut 40 applied thereto. Between the nut 40 and the outer side of the rim is placed a metal washer 41 provided on its inner face with a resilient washer or gasket 41A, the gasket and washer being of sufficient size to extend beyond the ends of the elongated opening 37 and seal the same when the nut 40 is tightened. It will be readily apparent from the construction just described that the valve 36 can be placed in the rim from the exterior thereof by aligning the elongated base 38 with the opening 37 in the rim, passing the base of the valve through the opening sufficiently to permit the portion 38A to be entirely inwardly of the sides of the opening 37, and then rotating the valve about its axis through 90° after which the valve is moved outwardly of the opening until the squared portion 38A seats in the opening 37 whereupon the washer 41 and nut 40 are applied and the nut tightened.

The well 19' of this modified form of rim is provided with a wall or bridging member 27' similar to the member 27 in the form of the invention shown in Figs. 1 to 5 and serving a like purpose. However, in this modified form of the invention, the upper inner edge of the top surface 30' of the wall member 27' does not form an air-tight seal with the adjacent edge of the wall or the well 19'. Instead, air passageways 42 are provided in this region of the well and bridge member to permit the air coming from the valve 36 to enter into the portion of the rim adjacent the cover or bridge member 27' the other edges of the bridging member being secured to the ring in air-tight relationship. The recesses or passageways 42 may be provided in any desired form, as for example by cutting a small portion from the adjacent edge of the top surface 30' or the wall member 27'. However, as shown in Figure 6, the passageways 42 have been provided by indentations or recesses formed in the edge of the upper inner wall portion for the well 19'.

It will be observed that in the modification shown in Figs. 6 and 7 no circumferentially extending raised portion similar to the portion 21 is provided. Hence, there is no means for preventing the tire bead 17' from dropping back into the well 19' after the tire has been placed upon the rim and before the removable well cover or bridging member 31' is applied. Such movement of the tire bead 17' into the well can, however, be prevented by suitable care in handling the tire. The tire is mounted upon the rim 10' by the same series of steps that have been described with respect to Figs. 1 and 2, so that the beads 16', 17' rest upon the substantially cylindrical portion 20'. Thereafter, the removable bridging or cover member 31', which is identical to the bridging or cover member 31 of the preferred embodiment, is applied and is retained in place by cooperating recesses and shoulder surfaces similar to those provided in the preferred embodiment. The removable band or member 31', like the member 31 is preferably formed of metal and is resilient so that it is self-retained in its proper position.

After the tire has been mounted upon the base 10' and the removable band or bridging member 31' is applied, the tire beads are moved outwardly until they travel far enough onto the bead seat 13' and the cover or bridging members 27', 31' so that sufficient sealing is achieved to permit retention therein of air under pressure. This initial positioning of the beads can be effected by radially compressing the tire in the tread region as is well known in the art of mounting tubeless tires. In this position of the tire, it will be found that the outer edge of bead 17' is upon the surface 30' and the band 31', while the inner edge of that bead is spaced from the opening 42 thus permitting passage of air from the enclosed portion of well 19' into the interior of the tire. Hence, high pressure air applied to the valve 36 will inflate the tire, causing the beads 16' and 17' to move into sealing engagement with the side flanges 11' and 12' as indicated in Fig. 6. The air pressure within the tire may then be adjusted to the desired operating value. The mounted tire can be removed from the rim by reversing the order of the manipulations which have been described as being performed in effecting the mounting and as will now be readily apparent from the above description of the present preferred embodiment.

A still further modification of the invention is illustrated in Figs. 8-10 of the drawings. As shown therein, the rim includes base and side flange portions with a well adjacent the one side flange similar to that previously described with respect to Figs. 1-7. Therefore, these and other similar parts are identified by the same numbers as employed in the embodiments illustrated in Figs. 1-5 and 6-7 respectively, but with a double prime mark added thereto. Thus, the instant form of rim comprises a rim base 10" with a central, substantially cylindrical portion 20" and integral side flanges 11" and 12" with which the beads 16" and 17" of a tubeless tire 15" are adapted to cooperate to provide an air-tight compartment or container. Adjacent flange 11", the rim base 10" has a tapered bead seat 13", and adjacent the side flange 12" the rim base has a radial, circumferentially extended well or recess 19". In the instant embodiment of the invention, however, this well does not extend around the entire circumferential extent of the rim but instead the well is interrupted by an integral portion 43 of the rim which is shaped substantially similar to the aforementioned bridging members 27 and 27'. Thus, the upper surface 44 of the portion 43 provides a tapered bead seat for the bead 17" of the tire similar to the seat 13" provided adjacent the opposite flange of the rim. This surface 44 merges with the side and bottom walls of the well 19" by means of integral sloped portion 45 and 46, the rim being thus formed by suitable rolling, forging swaging or other well known operations.

An inflation valve 47 is provided in the rim base in the region intermediate the ends of the recess 19". This valve may be of any suitable type. As here shown, the valve comprises a base flange 48 with an integral bent shank 49 extending through an opening in the rim with the outer end of the valve disposed between the wall portions 45 and 46 of the well. The shank 49 of the valve has a threaded portion adjacent the rim for the reception of a nut 50 and between this nut and the adjacent surface of the rim are a metal washer 51 and resilient washer or gasket 52. If desired, a resilient gasket or washer may also be provided between the base 48 of the valve and the inner surface of the rim. Preferably the rim is provided with a circumferentially extending raised surface or projection 21" adjacent the inner edge of the well 19" which performs the same functions as the surface or projection 21 in the embodiment illustrated in Figs. 1-5.

In mounting a tire upon this form of rim one bead, such as 16", of the tire is moved so that it enters into the well 19" and the remainder of the bead is then placed over the adjacent flange 12" at the location of the surface 44. The tire is then shifted until the bead 16" is concentric with the rim so that the bead 16" moves up onto the substantially cylindrical central portion 20" of the rim base. The other bead 17" is then similarly passed over the flange 12" and this bead is likewise moved upon the cylindrical portion 20" of the rim so that the beads occupy a position as shown in Figure 8. The well 19" is then provided with a removable bridging or cover member 31" which is identical to the bridging or cover members 31 and 31' previously described. The bridging or cover member 31" is retained in place over the well 19" by suitable cooperating shoulder surfaces as will now be readily understood, the removable member being preferably formed of metal and resilient so that it is self-retained in its proper position. After the member 31" is thus positioned, the tire beads are moved outwardly upon the bead seat 13" and onto the raised surface 21", this positioning being effected by radially compressing the tire in the tread region as is well known in the art of mounting tubeless tires. Air under pressure is then applied to the valve 47 and the pressure developed within the compartment provided by the rim and tire causes the beads 16" and 17" to move outwardly into sealing engagement with the side flanges 11" and 12". The air pressure within the tire may then be adjusted to the desired operating value. The mounted tire may be removed from the rim by reversing the steps described as will now be readily apparent.

It should now be evident that, in accordance with this invention, it is possible to provide a rim having a smaller diameter than conventional drop center rims without sacrificing any of the region available for the brake drum. Therefore, smaller diameter tires can be employed without sacrifice in safety of braking operations. That is to say, the diameter of the brake drum can be substantially the same as the internal diameter of the rim base central portion 20, 20' or 20" with the well 19, or the wells 19', 19" in the modified forms of the rim, extending at one side of that brake drum. The supporting structure by which the rim is attached to the hub of the vehicle wheel is not here shown but can take any shape or configuration that may be convenient or desired.

In the embodiments here shown and described, the width of the wells 19, 19' and 19" has been described as being only sufficient to accommodate one bead of the tire at a time. It will be understood, however, that where the rim is of sufficient width so that adequate space for the brake drum can be provided at the side of a wider well, then the well can have a width sufficient to accommodate both beads of the tire at once in the manner similar to the drop center of the present conventional rim. These and other modifications and adaptations of the invention, which will occur to those skilled in the art after having had the advantage of this disclosure, are considered as encompassed within the ambit of the invention, the scope of which is defined in the appended claims.

Having thus described the invention, I claim:

1. A rim for a tubeless pneumatic tire comprising a circumferentially extending base portion and integral side flange portions, the said base portion having a radial well extending circumferentially adjacent one of said flanges to accommodate tire beads during mounting or demounting thereof, valve means secured in sealing relationship to an opening in said rim adjacent said one flange and positioned to communicate with the interior of a tire when mounted on the rim, a rigid surface extending from said one flange to said base portion in the vicinity of said valve means facilitating passage of the tire beads over the inner end of said valve means, and removable means bridging said well and cooperating with said rigid surface to provide a seat for a bead of a tire mounted on the rim.

2. A rim for tubeless pneumatic tires comprising a substantially cylindrical base portion and integral substantially radial side flange portions, the said base portion having a circumferentially extending well intermediate the center of said base portion and one of the said flanges to accommodate tire beads during mounting or demounting, a valve secured in sealing relationship in an opening in said rim and positioned to communicate with the interior of a tire mounted on the rim, a rigid surface extending from said one flange to said base portion in the vicinity of said valve facilitating passage of the tire beads over the inner end of said valve, and removable means bridging said well and cooperating with said rigid surface to provide a seat for a bead of a tire mounted on said rim.

3. A rim for a tubeless pneumatic tire comprising a circumferentially extending base portion and integral side flange portions, the said base portion having a radial well extending circumferentially adjacent one of the said flanges to accommodate tire beads during mounting or demounting thereof, valve means in a wall of said well, and means including a fixed portion and a removable portion bridging said well and providing a seat for a bead of a tire mounted on the rim with the said valve means located beneath said fixed portion.

4. A rim for tubeless pneumatic tires comprising a substantially cylindrical base portion and integral substantially radial side flange portions, the said base portion having a circumferentially extending well adjacent one of the said flanges to accommodate tire beads during mounting or demounting, a valve secured in sealing relationship in an opening in a wall of said well, and means including a fixed portion and a removable portion bridging said well and providing a seat for a bead of a tire mounted on said rim with the said valve located beneath said fixed portion.

5. A rim for a tubeless pneumatic tire comprising a circumferentially extending base portion and integral side flange portions, the said base portion having a radial well extending circumferentially adjacent one of the said flanges to accommodate tire beads during mounting or demounting thereof, valve means in a wall of said well, means secured to said rim and having a portion bridging the entrance to said well in the region over said valve means with an air-conducting opening communicating said region with the interior of a tire when mounted on the rim, and removable means positionable at the entrance to the remainder of said well to bridge the latter and provide a seat for a bead of a tire mounted on the rim.

6. A rim for a tubeless pneumatic tire comprising a circumferentially extending base portion and integral side flange portions, the said base portion having a radial well extending circumferentially adjacent one of the said flanges to accommodate tire beads during mounting and demounting thereof, an inflation controlling valve secured in sealing relationship in an opening in a wall of said well, impervious means secured to said rim with a portion bridging the entrance to said well in the region over said valve and other portions partitioning the inner end of said valve from communication with the remainder of said well, there being an opening extending from the interior of said means to the outer surface of the said base portion of the rim, and a split annular band positionable at the entrance to the remainder of said well to bridge the latter and provide a seat for a bead of a tire mounted on the rim.

7. A rim for a tubeless pneumatic tire comprising a circumferentially extending base portion and integral side flange portions, the said base portion having a radial well extending circumferentially adjacent one of the said flanges to accommodate tire beads during mounting and demounting thereof, an inflation controlling valve secured in sealing relationship in an opening in a wall of said well, impervious means secured to said rim providing an enclosure about the inner end of said valve with a portion of said means bridging the entrance to said well in the region over said valve, the said rim having a passageway extending from said enclosure to the outer surface of said base portion, and a split annular band positionable at the entrance of the remainder of said well to bridge the latter and provide a seat for a bead of a tire mounted on the rim.

8. A rim for a tubeless pneumatic tire comprising a circumferentially extending base portion and integral side flange portions, the said base portion having a radial well extending circumferentially adjacent one of the said flanges to accommodate tire beads during mounting and demounting thereof, an inflation controlling valve secured in sealing relationship in an opening in a wall of said well, a wall member secured to said rim in the region of said valve with a portion bridging the entrance to the well at said valve and other portions partitioning the inner end of said valve from communication with the remainder of said well, a split resilient annular band removably positionable at the entrance to the remainder of said well to bridge the latter and provide a seat for a bead of a tire mounted on the rim, the base portion of said rim having a circumferentially extending raised surface on the other side of said well from the adjacent side flange which surface has a diameter in the order of the diameter of the bead bases of a tire adapted to be mounted on said rim, and the said rim having an opening extending from the portion of said well within said wall member to the outer surface of said base portion.

9. A rim as defined in claim 8 wherein the central portion of said base is substantially cylindrical while the surface of the portion of the rim base adjacent the other of the side flanges and said annular band are inclined upwardly toward the respective side flanges at an angle in the order of five degrees.

10. A rim as defined in claim 1 wherein the said radial well extends a distance less than the entire circumference of the rim with an integral portion of the rim between the ends of said well providing the said rigid surface.

11. A rim as defined in claim 10 wherein the base portion has a circumferentially extending raised surface adjacent the inner edge of said well which surface has a diameter in the order of the diameter of the bead bases of a tire adapted to be mounted on said rim.

12. A tire and rim assembly comprising a tubeless tire having spaced beads, a metal rim on which said tire is mounted including a circumferentially extending base portion and integral flanges cooperating with the sides of the beads of said tire to provide an air-tight compartment, the said rim having a radial well extending circumferentially adjacent one side flange to accommodate the tire beads during mounting and demounting of the tire, valve means secured in sealing relationship to an opening in said rim adjacent said one flange and positioned to communicate with the interior of said tire to thereby control the admission to and exhaust of air from said compartment, a rigid surface extending from said one flange to said base portion in the vicinity of said valve means and providing a portion of a seat for one of the tire beads, and removable means bridging said well and cooperating with said rigid surface to provide the remainder of the seat for said one of the tire beads.

13. A tire and rim assembly comprising a tubeless tire having spaced beads, a metal rim mounting said tire, the said rim including a circumferentially extending base portion and integral side flanges cooperating with the tire beads to provide an air-tight compartment, the said rim having a radial well extending circumferentially adjacent one side flange adapted to accommodate the tire beads during mounting and demounting of the tire, means including cooperating fixed and removable portions bridging said well and providing a seat for one of the tire beads, and valve means in a wall of said well beneath said fixed portion of the bridging means and communicating with the interior of said tire for controlling admission to and exhaust of air from said compartment.

14. A tire and rim assembly as defined in claim 13 wherein the side edges of said well and either end of said fixed portion of the bridging means have shoulders for receiving and retaining the removable portion of the bridging means in position over said well such that the outer surface of the bridging means forms a continuation of the surface of the rim base.

15. A tire and rim assembly as defined in claim 14 wherein the said removable portion of the bridging means is a split resilient metal band which is so shaped that its resiliency retains it in place between said shoulders.

16. A tire and rim assembly as defined in claim 12 wherein the said radial well extends a distance less than the entire circumference of the rim with an integral portion of the rim between the ends of said well providing the said rigid surface.

17. A tire and rim assembly as defined in claim 12 wherein the said rim has a tire bead seat adjacent the other of said flanges and the base portion of the rim between said seats is substantially cylindrical with the diameter thereof slightly less than the diameter of the tire beads to permit free movement thereover of said tire beads.

18. A tire and rim assembly as defined in claim 17 wherein the bead seat adjacent said other flange and the said removable means adjacent said one flange are inclined upwardly toward the respective flanges at an angle in the order of five degrees.

19. A tire and rim assembly as defined in claim 17 wherein the removable means covering said well is a resilient split band the edges of which seat in recesses provided at the ends of said rigid surface and at the sides of said well so that the said band forms a smooth continuation of the rim base.

20. A tire and rim assembly comprising a tubeless tire having spaced beads, a metal rim mounting said tire, the said rim including a substantially cylindrical base portion and integral substantially radial side flanges cooperating with the sides of the tire beads to provide an air-tight seal, the said base portion having a bead seat adjacent one side flange and a radial well extending circumferentially adjacent the other side flange to accommodate the tire beads during mounting and dismounting of the tire, a circumferentially extending raised surface on the rim base adjacent the inner edge of said well which surface has a diameter in the order of the diameter of the tire beads, means including a removable portion covering said well and providing a bead seat adjacent said one side flange, the said rim having a fluid passage extending from said well to a location between said one side flange and said raised surface, and valve means in a wall of said well for controlling the admission to and exhaust of air from the compartment provided between tire and rim.

21. A tire and rim assembly as defined in claim 20 wherein the bead seat adjacent said one flange and the said removable portion adjacent the said other flange are inclined upwardly toward the respective flanges at an angle in the order of 5 degrees.

22. A tire and rim assembly as defined in claim 20 wherein the means covering said well includes a fixed wall member secured to the said base portion over said valve and a removable resilient split band the edges of which seat in recesses provided in the ends of said fixed wall member and in the sides of said well so that the said band forms a smooth continuation of the rim base.

References Cited in the file of this patent

UNITED STATES PATENTS

| | | |
|---|---|---|
| 2,587,470 | Herzegh | Feb. 26, 1952 |
| 2,731,064 | Powers | Jan. 17, 1956 |

FOREIGN PATENTS

| | | |
|---|---|---|
| 304,297 | Great Britain | Mar. 27, 1930 |